(12) United States Patent
Mittler et al.

(10) Patent No.: US 10,969,013 B2
(45) Date of Patent: Apr. 6, 2021

(54) COMPRESSION OIL CONTROL PISTON RING

(71) Applicant: FEDERAL-MOGUL BURSCHEID GMBH, Burscheid (DE)

(72) Inventors: Richard Mittler, Burscheid (DE); Fabian Ruch, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 14 days.

(21) Appl. No.: 16/306,071

(22) PCT Filed: May 22, 2017

(86) PCT No.: PCT/EP2017/062263
§ 371 (c)(1),
(2) Date: Nov. 30, 2018

(87) PCT Pub. No.: WO2017/207323
PCT Pub. Date: Dec. 7, 2017

(65) Prior Publication Data
US 2019/0136976 A1   May 9, 2019

(30) Foreign Application Priority Data

Jun. 1, 2016   (DE) .................. 10 2016 110 105.2

(51) Int. Cl.
*F16J 9/20*   (2006.01)
(52) U.S. Cl.
CPC .................................. *F16J 9/206* (2013.01)

(58) Field of Classification Search
CPC .......... F16J 9/00; F16J 9/12; F16J 9/20; F16J 9/206
See application file for complete search history.

(56) References Cited

U.S. PATENT DOCUMENTS

| | | | |
|---|---|---|---|
| 1,894,672 A | 1/1933 | Fritz | |
| 2,772,931 A * | 12/1956 | Biedermann | F04B 53/143 92/250 |
| 2,867,482 A * | 1/1959 | Schmidt | F16J 9/20 277/438 |
| 3,347,556 A * | 10/1967 | Fleckenstein | F16J 15/32 277/566 |
| 3,563,442 A * | 2/1971 | Kretchman | F16J 15/3236 277/438 |
| 3,563,557 A * | 2/1971 | Doutt | F16J 15/3236 277/438 |
| 4,572,515 A * | 2/1986 | Grazioli | F16K 5/0673 251/317 |
| 2015/0267813 A1 | 9/2015 | Williams | |

FOREIGN PATENT DOCUMENTS

| | | | | |
|---|---|---|---|---|
| DE | 3511851 A1 | 10/1986 | | |
| DE | 102009036240 A1 | 2/2011 | | |
| JP | 06017939 A * | 1/1994 | | F16J 15/3236 |

* cited by examiner

*Primary Examiner* — Gilbert Y Lee
(74) *Attorney, Agent, or Firm* — Robert L. Stearns; Dickinson Wright, PLLC

(57) ABSTRACT

A compression piston ring is provided, in particular a piston ring suitable as a second piston ring in a three-ring piston ring set, which piston ring has convex sections and concave sections alternating in the circumferential direction in a middle running face region in relation to the axial height, wherein the concave sections form profile recesses in the convexly crowned running face.

16 Claims, 2 Drawing Sheets

COMPRESSION OIL CONTROL PISTON RING

BACKGROUND

1. Technical Field

The invention relates to a piston ring, in particular a compression piston ring having an oil control effect.

2. Related Art

One of the main problems in four-stroke engines lies in the control and sealing of the piston ring and piston system from and with crankcase oil. To this end, piston rings are used, which are intended to seal off the combustion chamber as well as possible from the oil in the crankcase: what are known as oil rings or oil control rings, and compression rings, which are intended to seal off the combustion chamber as well as possible to avoid quantities of leaking gas, also referred to as blow-by gases. Typically, two compression rings are used on the combustion chamber side and one oil control ring is used on the crankcase side. Recently, the second compression ring, that is, the middle ring, is increasingly expected to fulfil a type of double role: the ring is intended to provide a compression function on one side and an oil control function on the other side.

Usually, taper faced rings or napier rings, which have the sharpest possible lower outer edge to scrape oil, are used as the second compression ring. The disadvantage of these rings in the case of highly supercharged engines is that instability can result from the high pressure on the running face, leading to radial liftoff from the cylinder wall. The function of scraping from the cylinder wall can only be fulfilled by means of large quantities of oil which are thrown back by the piston towards the cylinder wall. It should be noted here that these quantities should be supplied to the oil ring, but the latter is not able to transport these quantities of oil towards the crankcase owing to small connecting pieces.

SUMMARY

There is a need for a compression piston ring which has a sufficient oil control capacity and with which radial liftoff from the cylinder wall is avoided at the same time.

This problem is solved by a piston ring according to the invention, the outer running face of which is divided into regions which extend around in the circumferential direction over different axial height regions of the running face: an upper running face region on the combustion chamber side, a lower running face region on the crankcase side, and a middle running face region between the upper and lower running face regions. The boundary line between the upper and the middle running face regions forms a scraping line, and the boundary line between the middle and the lower running face regions forms a crest line, the scraping line running radially further outwards than the crest line. The upper and the lower running face regions are curved convexly outwards as viewed in axial cross-section. The middle running face region has, alternating in the circumferential direction, convex sections which are curved convexly outwards as viewed in axial cross-section, and concave sections which are at least partially curved concavely inwards as viewed in axial cross-section.

According to one aspect of the present invention, the crest line can lie radially further outwards than at least one radially innermost point of the concave sections.

According to a further aspect, the radial distance between the scraping line and the at least one radially innermost point of the concave sections is less than five times the radial distance between the scraping line and the crest line.

According to a further aspect, the running face is smooth, without edges, in every axial cross-sectional view.

According to a further aspect, the concave sections and the convex sections of the middle running face region merge smoothly into each other without forming edges.

According to a further aspect, the middle running face region has 3-30, preferably 8-24, further preferably 12-18 concave sections in the circumferential direction.

According to a further aspect, each of the convex sections extends over an angle of at least 5° in the circumferential direction.

According to a further aspect, the ends of the running face which are adjacent to the ring gap have a convex section.

According to a further aspect, the scraping line and the crest line have a substantially constant distance from a piston ring flank in the circumferential direction.

According to a further aspect, the distance in the radial direction between the scraping line and the crest line is substantially constant in the circumferential direction.

According to a further aspect, the scraping line runs, measured from the flank on the crankcase side, at an axial height of 45-70%, preferably 50-60%, of the total axial height of the piston ring.

According to a further aspect, the running face forms a closed face, there being no openings running through the piston ring to the piston ring inner side.

The usual terminology is used here, in which the term axial refers to the corresponding direction of the piston, that is, the direction in which it moves back and forth, or to the corresponding axis of the piston-cylinder. The ring axis is the axis running through the centre point of the ring in the axial direction and coinciding with the centre axis of the piston in the installed state. Correspondingly, a radial direction is a direction which runs parallel to the ring plane, towards or away from the ring axis. An axial cross-section means a cross-section in which the ring axis lies in the section plane.

BRIEF DESCRIPTION OF THE DRAWING

Exemplary embodiments of the invention are described in more detail below with reference to the drawings, in which.

DETAILED DESCRIPTION

Figure 1:
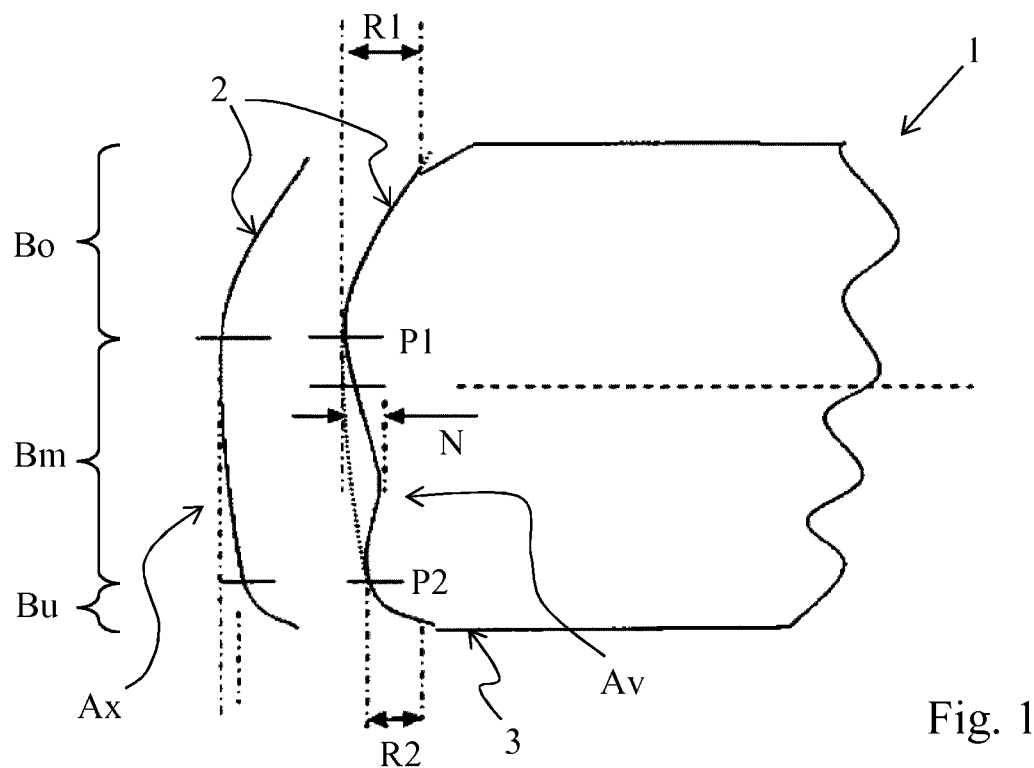
FIG. 1 shows axial cross-sectional views of the piston ring.

FIG. 1 shows an axial cross-sectional view of an embodiment of the piston ring 1 according to the invention. The contour of the running face 2 is shown twice in the figure, the contours shown on the left and on the right differing in shape and belonging to different sections in the circumferential direction. The running face 2 of the piston ring 1 is divided into three regions in the axial direction: an upper running face region Bo, a middle running face region Bm and a lower running face region Bu. In this case, top refers to the side of the ring 1 towards the combustion chamber, and bottom correspondingly refers to the side towards the crankcase.

The lines at which running face regions Bo, Bm, Bu adjoin form a scraping line P1 on the combustion chamber side at the top and a crest line P2 on the crankcase side at the bottom. The crest line P2 is spaced radially inwards from the scraping line P1, i.e. the distance R2 of the crest line P2 from a reference line, as shown in the figure, is less than the distance R1 of the scraping line P1 from the same reference line. The crest line P2 preferably runs in the circumferential direction at a substantially constant radial distance R1-R2 from the scraping line P1. The scraping line P1 is the radially outermost region of the piston ring 1; a pivot point is formed here in the axial cross-sectional view. When installed, the piston ring 1 will bear against the cylinder wall at the scraping line P1 and in a narrow region around the scraping line P1 and scrape oil downwards from the cylinder wall when the piston moves downwards.

Because the piston ring 1 bears against the cylinder wall further up than with a taper faced or napier ring usually used as the middle piston ring, a smaller region, i.e. a smaller area, relative to a taper faced ring, for example, is available between the cylinder wall and the piston ring for combustion chamber gases to penetrate into and push the piston ring away from the cylinder wall. Correspondingly, there is a smaller inwardly acting force which is caused by the gas pressure and pushes the piston ring away from the cylinder wall, and therefore the likelihood of radial liftoff from the cylinder wall is reduced and the sealing function of the ring is improved.

The upper running face region Bo and the lower running face region Bu have an outward, convex curvature which remains the same in the circumferential direction, as viewed in axial cross-section. Curved convexly outwards in this case means that, for each point in the region, a circle can be drawn which runs through the point and the curvature of which is equal to that of the running face in the point in the axial cross-sectional view and which coincides substantially in the surroundings of the point with the axial cross-sectional view of the running face, the centre point of the circle lying, as seen from the running face, towards the inner side of the ring, that is towards the ring axis or, if the curvature is correspondingly small, on the other side of the ring axis. Curved concavely inwards analogously means that the centre point of the circle is situated towards the outside.

The middle running face region Bm has two alternating types of section in the circumferential direction: convex sections Ax and concave sections Av. In the convex sections Ax, the running face 2 is curved convexly outwards as viewed in axial cross-section; this applies to the entire axial height of the middle region Bm. Since the transitions between the running face regions Bo, Bm, Bu are preferably smooth, this means that the running face 2 in the convex sections Ax is curved convexly outwards over its entire axial height, that is, is crowned, as viewed in cross-section. Smooth means that no edges, no corners in a cross-sectional view, are formed; the curve can therefore be described by a differentiable function.

In the concave sections Av, the running face 2 is at least partially curved concavely inwards as viewed in axial cross-section. Relative to the convexly crowned running face in the convex sections Ax, inward depressions are produced thereby. Therefore, the profile of the piston ring in these sections is somewhat set back; profile recesses are formed. Generally, the running face will be only partially curved concavely inwards in the concave sections Av, to allow a smooth transition without edges between the running face regions Bo, Bm, Bu.

The radially innermost point of the concave sections Av in question, that is, the deepest point of the depressions, is preferably radially further inwards than the crest line P2. On the other hand, the radial distance N of this at least one innermost point from the scraping line P1 should not exceed five times the radial distance R1-R2 between the scraping line P1 and the crest line P2. This radial distance N and the number of the convex sections Ax describe a volume into which oil can be received when the piston moves downwards.

The shape of the running face 2 of the piston ring 1, with convex and concave sections Ax, Av alternating around the circumference in the middle running face region Bm, results in a hydrodynamic pressure difference in the oil and thus in a distribution of the oil in the circumferential direction. The volume provided by the profile recesses in the concave sections Av can at the same time receive oil; therefore, when the piston moves downwards, the oil on the cylinder wall is not just "passed over", which could possibly happen, since the scraping line P1 in contact with the cylinder wall is arranged relatively far up, for example in comparison with a taper faced ring, and therefore a relatively large region is available for oil to penetrate into and push the ring away from the cylinder wall.

Preferably, the running face is smooth, without edges, that is, with a constant tangent, in every axial cross-sectional view. Further preferably, the running face is also formed smoothly without edges in the circumferential direction; in particular, therefore, the concave sections Av and the convex sections Ax merge smoothly into each other without forming edges. If both apply, the running face therefore forms, in more mathematical terms, a differentiable function, e.g. in cylinder coordinates.

In FIG. 1, the scraping line P1 is arranged slightly above the middle of the axial height of the piston ring 1. The scraping line P1 is preferably arranged in the vicinity of the middle or above the middle. More precisely, the axial distance from the lower ring flank 3 is preferably 45-70%, further preferably 50-60%, of the total axial height of the piston ring.

Figure 2:
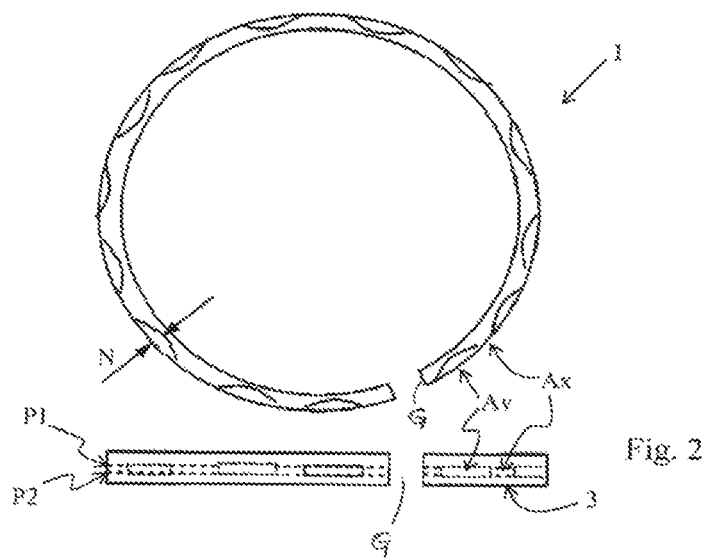
FIG. 2 shows a plan view and an associated partial flat pattern of the piston ring.

FIG. 2 shows a plan view (top) and an associated partial flat pattern (bottom) of an exemplary embodiment of the piston ring 1 according to the invention. The information given for FIG. 1 above also applies here. The piston ring 1 has a ring gap G, common to piston rings. The ring gap G forms an interruption or break in the circumference of the piston ring 1, giving it a generally C-shape as illustrated. The ring gap G, extends completely through the body of the piston ring both in the radial direction and axial direction. The concave sections Av and convex sections Ax which alternate in the circumferential direction can be seen in the plan view. The radial distance N of the at least one innermost point from the scraping line P1, which lies furthest outwards, is also shown. The depressions are shown with exaggerated depth in order to remain visible; for this reason, the depressions are also shown with a non-dashed line, even though they are not visible when viewed from above.

Fourteen concave sections Av are shown in the exemplary figure. The running face preferably has 3-30, preferably 8-24, further preferably 12-18 concave sections Av in the circumferential direction. Furthermore, the running face preferably ends with a convex section Ax on both sides of the ring gap to prevent oil being pushed towards the ring gap. Each of the convex sections also preferably covers an angle range of at least 5° in the circumferential direction. The running face is therefore crowned, with profile recesses which produce a hydrodynamic pressure to distribute the oil and provide volumes to receive the oil.

The partial flat pattern also shows (with dashed lines) the scraping line P1 and the crest line P2. Although shown continuously here, the crest line P2 comes to bear only at the concave sections Av, where a second pivot point is formed in the axial cross-sectional view of FIG. 1. In the preferred embodiment shown, the axial distance of the scraping line P1 and the crest line P2 from the lower piston ring flank 3 is substantially constant in the circumferential direction. Furthermore, there are no openings running through the piston ring body to the inner side of the piston ring.

The invention claimed is:

1. A piston ring for an internal combustion engine, comprising a piston ring body having, an outer running face divided into regions which extend around in the circumferential direction over different axial height regions of the running face, said regions comprising
an upper running face region on a combustion chamber side,
a lower running face region on a crankcase side, and
a middle running face region between the upper and lower running face regions;
wherein the boundary line between the upper and middle running face regions forms a scraping line,
wherein the boundary line between the middle and lower running face regions forms a crest line,
wherein the scraping line runs radially further outwards than the crest line;
wherein the upper and lower running face regions are curved convexly outwards over their entire axial height, as viewed in axial cross-section;
wherein the middle running face region has, alternating in the circumferential direction, convex sections which are curved convexly outwards as viewed in axial cross-section, and concave sections which are at least partially curved concavely inwards as viewed in axial cross-section; and
wherein the circumference of the piston ring includes a ring gap which forms an interruption in the circumference that extends fully through the radial width of the piston ring.

2. The piston ring according to claim 1, wherein the crest line lies radially further outwards than at least one radially innermost point of the concave sections.

3. The piston ring according to claim 1, wherein the radial distance between the scraping line and the at least one radially innermost point of the concave sections is less than five times the radial distance between the scraping line and the crest line.

4. The piston ring according to claim 1, wherein the running face is smooth, without edges between the running face regions Bo, Bu, Bm, in every axial cross-sectional view.

5. The piston ring according to claim 1, wherein the concave sections and the convex sections of the middle running face region merge smoothly into each other without forming edges.

6. The piston ring according to claim 1, wherein the middle running face region has 3-30, of said concave sections in the circumferential direction.

7. The piston ring according to claim 6, wherein there are 8-24 of said concave sections.

8. The piston ring according to claim 6, wherein there are 2-18 of said concave sections.

9. The piston ring according to claim 1, wherein each of the convex sections extends over an angle of at least 5° in the circumferential direction.

10. The piston ring according to claim 1, wherein the end regions of the running face which are adjacent to the ring gap form a convex section.

11. The piston ring according to claim 1, wherein the scraping line and the crest line have a substantially constant distance from a piston ring flank in the circumferential direction.

12. The piston ring according to claim 1, wherein the distance in the radial direction between the scraping line and the crest line is substantially constant in the circumferential direction.

13. The piston ring according to claim 1 wherein the scraping line runs, measured from the flank on the crankcase side, at an axial height of 45-70% of the total axial height of the piston ring.

14. The piston ring according to claim 13, wherein said axial height is 50-60% of said total axial height.

15. The piston ring according to claim 1, wherein the running face forms a closed face, there being no openings running through the piston ring to the piston ring inner side.

16. A piston ring for an internal combustion engine, comprising:
a circumferentially extending piston body having a top, bottom inner and outer surfaces;
a ring gap forming a physically break in the piston body and extending through the top, bottom, inner and outer surfaces;
the outer surface presenting an outer running face having at least three regions, including an upper region, a lower region and a middle region of the running face;
a common boundary between the upper and middle regions forming a scraping line;
a common boundary between the middle and lower regions forming a crest line disposed radially inwardly of the scraping line;
the upper and lower regions being outwardly convexly curved over a full axial height of each of the upper and lower regions; and
wherein the middle region has convexly outwardly curved sections interrupted by intervening concave sections.

* * * * *